No. 745,261. PATENTED NOV. 24, 1903.
W. F. STUBINGER.
JACKET ATTACHMENT FOR STEAM COOKING UTENSILS.
APPLICATION FILED JUNE 18, 1903.
NO MODEL.
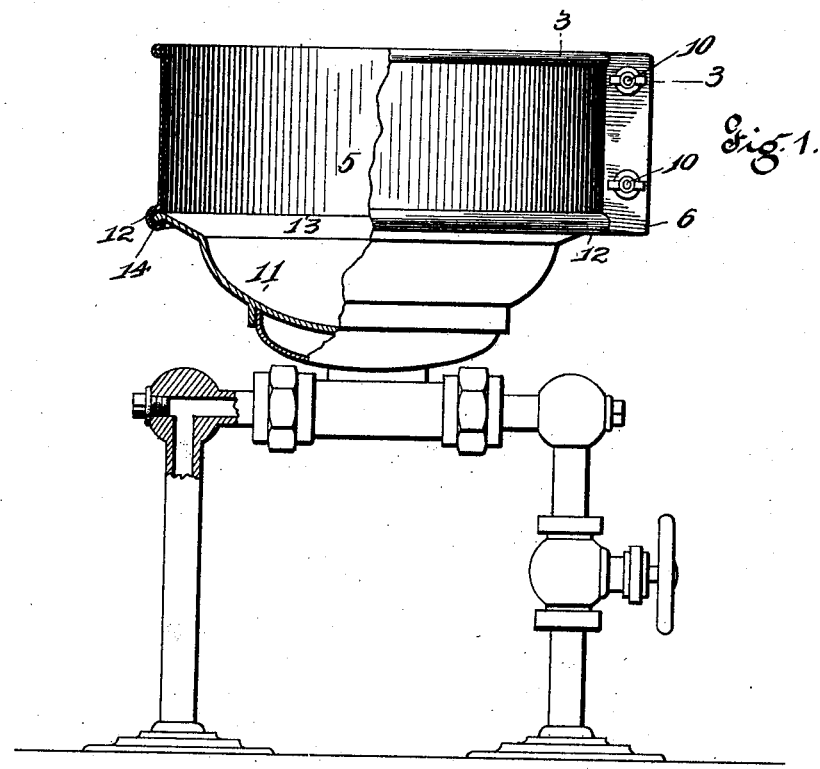
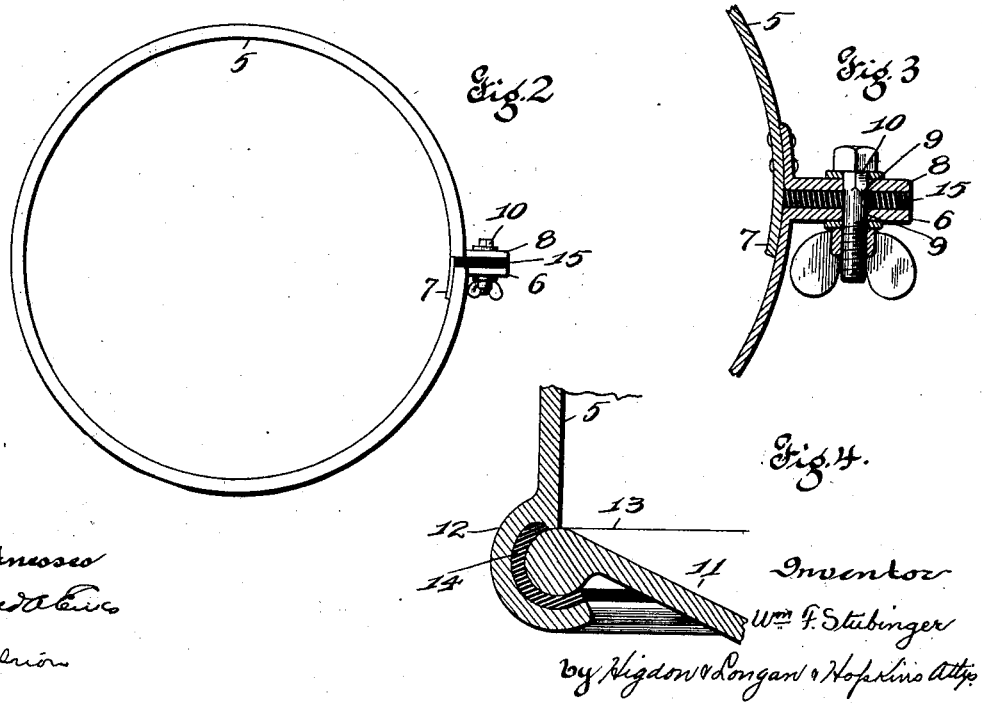
Witnesses
Inventor
Wm. F. Stubinger
by Higdon & Longan & Hopkins Attys No. 745,261. Patented November 24, 1903.

UNITED STATES PATENT OFFICE.

WILLIAM F. STUBINGER, OF ST. LOUIS, MISSOURI, ASSIGNOR TO THE SEXTON-STUBINGER RANGE COMPANY, OF ST. LOUIS, MISSOURI, A CORPORATION.

JACKET ATTACHMENT FOR STEAM COOKING UTENSILS.

SPECIFICATION forming part of Letters Patent No. 745,261, dated November 24, 1903.

Application filed June 18, 1903. Serial No. 162,038. (No model.)

*To all whom it may concern:*

Be it known that I, WILLIAM F. STUBINGER, a citizen of the United States, residing at St. Louis, State of Missouri, have invented certain new and useful Improvements in Jacket Attachments for Steam Cooking Utensils, of which the following is a specification containing a full, clear, and exact description, reference being had to the accompanying drawings, forming a part hereof.

This invention relates to a jacket attachment for steam cooking utensils; and it consists in the novel arrangement, construction, and combination of parts as will be fully hereinafter described and claimed.

The object of my invention is to construct a jacket to be attached to the rim or upper edge of the bowl or steam-pan wherein such edibles as soups and the like are cooked.

Figure 1 is a side view of my invention with a part in section, showing it placed in position upon the cooking utensil. Fig. 2 is a top plan view of the same. Fig. 3 is an enlarged detail horizontal sectional view taken on the line 3 3 of Fig. 1. Fig. 4 is a detail enlarged vertical sectional view of the lower end of the jacket, showing the manner in which it is held to the bowl.

In the construction of my invention I provide the jacket 5, preferably constructed of sheet material, its one end bent laterally, forming the flange 6, its other end 7 extending within the jacket past the edge of the flange 6, and to the outer surface, a short distance to the rear of the end 7, is suitably riveted the flange 8. Through the flanges are apertures 9, through which the bolts 10 are passed for the purpose of tightly contacting the jacket upon the edge of the bowl 11. The lower edge 12 is suitably bent, forming an open hook, and so shaped as to provide a perfect joint at the point indicated by the numeral 13.

A suitable rubber gasket 14 is placed between the open hook and the edge of the bowl and is for the purpose of allowing the said jacket to be tightly gripped around the upper edge of said bowl. Between the flanges 6 and 8 is also placed a rubber gasket 15, which is for the purpose of preventing leakage.

The jacket, as before described, is easily placed upon the bowl when it is desired to cook soup or liquid edibles, thus utilizing the steam cooking utensil, which is of common construction, for a purpose other than for the mere stewing of oysters or the like, for which the same was originally designed.

The device is simple in construction and readily placed in position, its contacting edges, by the use of the gaskets, being made water-tight.

Having fully described my invention, what I claim is—

1. A jacket attachment for steam cooking utensils, comprising a circular shell, a steam-bowl, flanges formed on said shell, the one end of said shell overlapping the other end, and means for tightly clamping said shell upon the upper edge of the steam-bowl, substantially as specified.

2. A device of the class described, comprising a shell, a steam-bowl, flanges formed on said shell, a rim formed on the bottom of said shell in the form of an open hook, a rubber gasket located within said rim, a rubber gasket placed between the flanges of said shell, and thumb-screws passed through said flanges for clamping said shell upon the steam-bowl, substantially as specified.

3. A jacket attachment for steam cooking utensils, comprising a shell, a steam-bowl; said shell arranged to be placed upon the said bowl; and means whereby the contacting surfaces are made leak-proof, substantially as specified.

In testimony whereof I have signed my name to this specification in presence of two subscribing witnesses.

WILLIAM F. STUBINGER.

Witnesses:
ALFRED A. EICKS,
M. G. IRION.